3,812,005
SELF-STICKING MATERIAL AND A PROCESS
FOR PRODUCING THE SAME
Keizo Katagiri, Mamoru Sakaguchi, and Tokumaro
Kamata, Katsuta, Japan, assignors to Nippon Kakoh
Seishi K.K., Tokyo, Japan
Filed Apr. 3, 1972, Ser. No. 240,610
Int. Cl. B32b 27/22, 27/28, 15/40
U.S. Cl. 161—247                                    28 Claims

ABSTRACT OF THE DISCLOSURE

A self-sticking material comprising a base sheet (5) with or without an adhesive (10) and a film of self-sticking composition (4) provided thereon with or without a releasing paper (3), and said self-sticking composition comprises 100 parts, by weight, of ethylene-vinyl acetate/vinyl chloride graft polymer (known as EVA/VC) and 31 to 100 parts of a plasticizer.

Said self-sticking material is used for preparing stickers and protecting sheets or the like.

---

This invention relates to a self-sticking material comprising a base sheet with or without an adhesive and a film of self-sticking composition provided thereon with or without a releasing paper, and said self-sticking composition comprises an ethylene vinyl acetate/vinyl chloride graft polymer and a plasticizer in a proportion of 100 parts, by weight, of the graft polymer and 31 to 100 parts of the plasticizer. The self-sticking material according to this invention can be stuck not only to a smooth surface but also a micro roughened surface of an article without any additional adhesive and is capable of sticking to and peeling off from such surface, repeatedly. Thus the self-sticking material is suitable for use as a sticker, a protecting sheet and the like.

It has been known to produce various sticking materials which ordinarily comprise a base sheet, such as paper, regenerated cellulose film, a plastic film and a metal foil, an adhesive provided thereon such as a natural and synthetic rubber and synthetic resin, and a releasing paper. However, such adhesives suffer from an inherent disadvantage in that rubbery adhesives have high sticking strength but are inferior in weatherability and heat durability and thus, after sticking, the material cannot be peeled off without leaving the adhesive on the surface of an adherened, and while a synthetic resin adhesive such as an acrylic type is superior in sticking strength and weatherability but sticking strength increases with the lapse of time and thus there is difficulty of peeling off the sticking material from the surface of an adherend and sometimes it results in breaking down. Furthermore, another disadvantage of such sticking material which is usually in a form of roll or sheet is cold flow of the adhesive which takes place by being forced out from the adhesive layer at the peripheral edge of the product by its own weight during transport or storage, and leads to blocking.

A sticking material has also been produced by coating a heat gelled composition comprising 100 parts, by weight, of polyvinyl chloride and 50 to 100 parts of a plasticizer on a releasing paper; its peel strength and sticking strength measured by the methods described hereinafter are only 3 to 20 g./3 cm. and 350–55 g./cm.$^2$, respectively. Thus, the sticking material can adhere to a smooth surface but not to a micro roughened surface, for example paper, wood, and frosted glass. Furthermore, the stickiness of the sticking material varies with temperature change and decreases with the lapse of time by evaporation of the plasticizer.

Accordingly, an object of this invention is to provide a self-sticking material capable of sticking not only to a smooth surface but also a micro roughened surface of an article without any additional adhesive and repeatedly adhering to and peeling off from the surface.

Another object is to provide a self-sticking material which does not show a tendency of blocking when the self-sticking materials are piled up.

Further, another object is to provide a self-sticking material having an improved weatherability, that is, its sticking strength does not reduce at a low temperature, while its stiffness does not change at a high temperature.

Still another object is to provide a process for producing such self-sticking material.

The self-sticking material according to this invention comprises a base sheet and a film of self-sticking composition with or without a releasing paper bonded together successively and the base sheet and a film of self-sticking composition may be bonded with or without an adhesive. Depending upon the use of the self-sticking material, the base sheet may be printed and/or embossed.

The self-sticking composition used for the self-sticking material according to this invention comprises 100 parts, by weight, of as ethylene-vinyl acetate/vinyl chloride graft polymer, 31 to 100 parts of a plasticizer, and, if desired, 0.5 to 5 parts of a stabilizer with or without 0.1 to 0.5 parts of a lubricant. The self-sticking composition is laminated by a calender or an extruder on a releasing paper or base sheet, or alternatively a solution of the self-sticking composition in an organic solvent is coated by a coater such as an air-knife-, a reverse roll- or a blade coater, on a releasing paper or base sheet, and thereafter, when the self-sticking composition is laminated or coated on a releasing paper, the base sheet is laminated on a film of self-sticking composition, if necessary, by an adhesive. The self-sticking material thus obtained may be printed and/or embossed for certain uses, for example, a sticker and decorating purposes; however, such treatment is unnecessary for a masking sheet and protecting sheet.

The self-sticking material according to this invention can be adhered not only to a smooth surface but also a micro roughened surface of an article without any additional adhesive after removing the releasing paper or as it is. If desired, the self-sticking material can be peeled off from and adhered to an article, repeatedly.

Hereinafter, the detailed description of this invention will be made by referring to the drawings.

Figure 1:
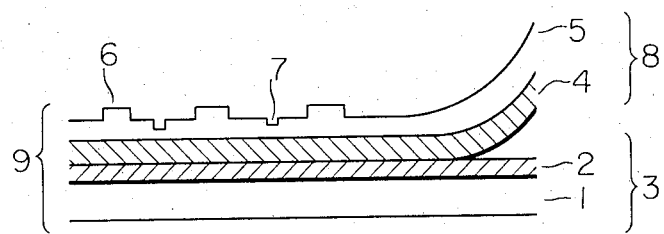
FIG. 1 is an enlarged cross-sectionally cut side view of a self-sticking material with a releasing paper according to this invention.

In FIG. 1, a film of self-sticking composition 4 is laminated or coated on a releasing paper 3 having releasing layer 2 on a base paper 1. Thereafter, with or without an adhesive a base sheet 5 is laminated on the film of self-sticking composition 4 to obtain self-sticking material 9. Patterns 6, 7 are printed and embossed on the base sheet 5 of self-sticking material 9 depending upon the uses. In case of use, the self-sticking sheet 8 is peeled off from the releasing paper 3 and stuck to a surface of an adherend.

Figure 2:
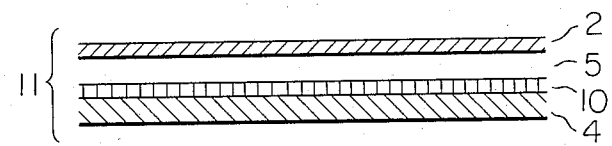
FIG. 2 is an enlarged cross-sectionally cut side view of a self-sticking material without a releasing paper according to this invention.

In FIG. 2, one side of a base sheet 5 is laminated or coated with a film of self-sticking composition 4 with an adhesive 10 and the opposite side of the base sheet 5 has a releasing layer 2 to obtain another form of self-sticking material 11.

The self-sticking composition employed according to this invention comprises an ethylene-vinylacetate/vinyl chloride graft polymer and a plasticizer.

The proportions of the constituting units of the graft polymer used are, by weight, of vinyl chloride to the copolymer 60 to 20:40 to 80, and ethylene to vinyl acetate, preferably, 40 to 70:60 to 30.

The plasticizers which can be used alone or in a mixture for the self-sticking composition includes various liquid organic compounds, typical examples of which include phthalates, such as dibutyl phthalate, di-n-octyl phthalate, di-iso-octyl phthalate and di(2-ethylhexyl) phthalate; dibase acid esters, such as di(2-ethylhexyl) adipate, di(2-ethylhexyl)sebacate, and di(2-ethylhexyl) azelate; phonphates, such as tri(2-ethylhexyl) phosphate, diphenyl-2-ethylhexyl phosphate, and triphenyl phosphates; polyesters, such as polypropylene adipate and polypropylene sebacate, and methylacetyl risinolate, butylphthalyl butyl glycolate. Such a plasticizer is blended in a proportion of 31 to 100 parts, by weight, preferably up to 80 parts with 100 parts of the graft polymer. The plasticizer in less than the specified amount tends to produce a self-sticking composition which has a sticking strength of 1500 to 2500 g./3 cm.$^2$ against polished steel and cannot stick to frosted glass and paper.

When the amount of the plasticizer exceeds the specific range, it results in a composition which has a high tackiness and stickiness and when applied to a paper, the self-sticking sheet cannot be peeled off from the paper without any breakage as conventional adhesives. Moreover, the self-sticking sheet has a defect that is it cannot be peeled off from another article without leaving any smear to a surface of an adherend.

But, in a composition blended with the specified amount of plasticizer, the peel strength and sticking strength against stainless steel plate are 5 to 100 g./3 cm. and 3200 to 5500 g./3 cm.$^2$, respectively. As the film of self-sticking composition according to this invention has such a strong sticking strength, it is able to stick to not only a smooth surface, but also a micro roughened surface without any bad influence.

The self-sticking composition according to this invention may contain a heat stabilizer with or without lubricant.

Examples of the heat stabilizer include stearates such as dibasic lead stearate, zinc-, calcium-, and barium stearate, dibutyl tin dimaleate, dibutyl tin dilaurate, and epoxidized soybean oil. Such stabilizer is blended with 100 parts, by weight, of the graft polymer in an amount of 0.5 to 5 parts. The stabilizer prevents a degradation of the self-sticking composition during calender-, extrusion- or solution coating onto the releasing paper or the base sheet.

Examples of the lubricant include stearyl amide, methylene bisstearyl amide, paraffine wax, stearic acid, and glycerine monooleate. As metal soaps such as lead, cadmium, zinc stearate have both heat stabilization and lubrication, they are omitted from the above lubricant. The amount of such lubricant blended with the graft polymer ranges to from 0.1 to 0.5 parts, by weight, per 100 parts of the graft polymer. If said amounts are more than 0.5 part, it tends to bloom and the sticking strength decreases.

The base paper for the releasing paper which is employed according to this invention and onto which surface the releasing agent is applied include, a smooth surfaced paper such as a one-side clay coated paper, glassine paper, parchment paper and wood free paper. The releasing agents, which are employed according to this invention include a synthetic resin, such as polyethylene, polypropylene, polyvinyl alcohol, and a polyamide, a saturated or unsaturated polyester resin, a urea-alkyd resin, a phenolic resin, and a silicone resin. It is preferable that peel strength of such a releasing agent from a film of the self-sticking composition is less than 100 g./3 cm.

The self-sticking composition is applied to the releasing paper or the base sheet by various means, for example, by calender, extruder, and coater. Where a calender or a extruder is employed, the self-sticking composition which contains a heat stabilizer with or without a lubricant is milled or kneaded in a mill roll, and thereafter a film of self-sticking composition of 50μ–200μ in thickness is formed at a temperature of 100° C. to 140° C. and is laminated on the releasing paper 3 or the base sheet 5. Where a coater such as air-knife, reverse roll-, and blade coater, is employed, such self-sticking composition in a form of a solution is applied to the releasing paper or the base sheet and dried at a temperature of about 100° C. to 140° C., while the self-sticking composition is simultaneously gelled. Solution coating is preferable when a film below 50μ thick is desired.

Examples of such a solvent used in solution coating include cyclohexanone, tetrahydrofuran, dioxane, benzene mono- and di-chlorobenzene, nitrobenzene, toluene, xylene, dimethylformamide, ethylenedichloride, trichloroethylene, tetrachloroethylene, acetone, methylethyl ketone, methyl acetate, ethyl acetate, butyl acetate, and Cellosolve acetate. The amount of the solvent used for preparing the coating solution is 300 to 1000 parts, by weight, per 100 parts of the graft polymer in the self-sticking composition, and less solvent results in a more viscous solution causing difficulty in the coating operation while more solvent produces a thin solution causing poor film-forming property.

The thickness of the film of self-sticking composition formed on the releasing paper 3 or the base sheet 5 is preferably from 10 to 200μ; a thinner film is not practical in view of poor sticking strength and a film thicker than 200μ does not have any further advantage.

When the film of self-sticking composition is laminated or coated on the releasing paper, on the film of self-sticking composition, there is laminated a base sheet, such as paper, woven and non-woven fabric, synthetic paper, metal foil and synthetic resin sheet including a thermoplastic resin, such as a vinyl chloride resin, an acrylic resin, a polyamide, a polystyrene, a saturated polyester, copolymer of ethylene and vinyl acetate, copolymer of acrylonitrile and styrene, copolymer of acrylonitrile, butadiene, and styrene and a thermosetting resin, such as an unsaturated polyester, polyurethane, and epoxy resin. It is preferable to select the base sheet from the above mentioned sheets to produce the self-sticking sheet having stiffness below 95. As a result, the self-sticking sheet can be easily stuck on the surface of an adherend. In general, where paper, fabric, and a resin film which have low adhesive property are employed, it is necessary to use a certain adhesive and/or special treatment e.g. surface oxidation for lamination. Such adhesives include a solution type, such as a nitrile rubber, polychloroprene, polyvinyl acetate, epoxy resin, and polyurethane resin, and an emulsion type, such as ethylene/vinyl acetate copolymer and vinyl chloride/vinyl acetate copolymer and the solution type adhesive may contain a cross-linking agent such as toluene diisocyanate in order to improve adhering strength.

On the other hand, when a film of self-sticking composition is laminated or coated on the base sheet with an adhesive, there is used a base sheet, such as paper having a releasing layer on one side (the releasing layer is formed by coating the releasing agents aforementioned onto said base paper), metal foil, and synthetic resin sheet such as polyethylene, polypropyrene and saturated polyester. In general, as those base sheets have low adhesive property, it is necessary to use said adhesives and/or surface oxidation treatment for applying the film of self-sticking composition.

Thus obtained self-sticking material may be printed and/or embossed on the base sheet by conventional means depending upon the uses.

In the tables, various figures are measured as follows.

1. Peel strength

A test sample has a dimension of 3 cm. x 15 cm. and the self-sticking sheet is peeled off from the releasing paper in a length of 3 cm. The self-sticking sheet and the releasing paper were fixed on upper and lower jaws, respectively, of "Tensilon" tested. Then, the self-sticking sheet and the releasing paper were peeled off at an angle of 180° and at a rate of 200 mm./min, and the load to peel off is measured.

2. Sticking strength

Of a piece of self-sticking material of 1 cm. x 6 cm., self-sticking sheet is peeled off from the releasing paper and subjected to this test. On a SUS 27CP stainless steel plate which has been polished with an abrasive paper, washed with toluene and dried, a half part of the test piece (1 cm. x 3 cm.) is laid and pressed to the plate by means of 1.5 kg. rubber roll which is reciprocated for once. Then, the test piece and the plate are fixed on upper and lower jaws of a "Tensilon" tester, respectively, and the test piece is pulled perpendicularly at a rate of 200 mm./min. The value of tensile shear stress is the sticking strength.

3. Stiffness

Ten pieces of 2.5 cm. x 25 cm. are cut from the self-sticking material and the self-sticking sheets peeled off from the pieces are employed as test specimens. The side which was contacted with the releasing paper is put inside. By the heart-loop method in JIS L 1005 stiffness is determined. (JIS stands for Japanese Industrial Standard)

4. Accelerated migration of plasticizer

A self-sticking sheet 8 peeled off from a releasing paper 3 is adhered onto plastic plates, such as acrylonitrile-styrene copolymer resin, unplasticized polyvinyl chloride resin and polycarbonate resin.

The specimen thus obtained is laid for a month in an atmosphere adjusted to a temperature 60° C.±2° C.

After the self-sticking sheet is put away, whether the plasticizer in the self-sticking sheet migrated to the plastic plates is visually observed in respect of cloudness, degeneration and discoloration at the adhered parts.

Three classes in the observation are as follows:

Non-remaining of the plasticizer _____ O
Traces of the plasticizer remaining _____ Δ
Remarkable remaining of the plasticizer _____ X

5. Peeling property, sticking smear remaining on an adherend and staining of an adherend A self-sticking sheet peeled off from a releasing paper is adhered onto plastic plates, such as an acrylonitrile-styrene copolymer resin, unplasticized polyvinyl chloride resin and polycarbonate resin. The specimen thus obtained is laid for 24 hours in an oven maintained at a temperature of 60° C.±2° C. After being taken out of the oven, the specimen is cooled an hour in the room temperature. Then, the self-sticking sheet is gently put away, at which time peeling property, reuseability, the extent of sticking smear remaining on the adherened and staining of the adherened are observed visually.

6. Blocking

The self-sticking material is cut into the size of 10 cm. x 10 cm. Ten such specimens are put together in a pile, on which a load of 175 g./cm.$^2$ is placed and is laid for a month. Thereafter, each one of the specimens is peeled off successively to observe blocking, an adhesive forced out and also the appearance of the base sheet.

This invention is further explained by Examples but it should be understood that the Examples are in no way limiting this invention.

EXAMPLE 1

A self-sticking composition comprised the following ingredients:

Parts by weight
Graft polymer (50 parts of ethylene-vinyl acetate copolymer (27.5/22.5) grafted with 50 parts of vinyl chloride) _____ 100
"Mark" AC (stabilizer available Adeka Argus K.K.) _____ 2.0
Stearic acid _____ 0.5
Di-2-ethylhexyl phthalate _____ 60

The composition was kneaded in a mill roll, pressed in a calender at about 110° C. into a film in a thickness of 80μ and was laminated on a releasing paper having an unsaturated polyester resin layer of a thickness of 20μ. Regenerated cellulose film of a thickness of 40μ whose surface to be laminated was undercoated with vinylchloride-vinyl acetate modified by toluene diisocyanate previously was laminated onto the film of self-sticking composition to obtain a self-sticking material. The obtained self-sticking material was printed on the regenerated cellulose film.

EXAMPLE 2

A self-sticking composition comprised the following ingredients:

Parts by weight
Graft polymer (50 parts of ethylene - vinyl acetate copolymer (35/15) grafted with 50 parts of vinyl chloride) _____ 100
Stearic acid _____ 0.3
Cadmium stearate _____ 1.5
Barium stearate _____ 1.5
Dioctyl adipate _____ 50

The composition was extruded through a T-die extruder at about 120° C. into a film 100μ thick and laminated on a releasing paper having a polyethylene layer 17μ thick, and then art paper 100μ thick whose surface was undercoated as in Exp. 1 was laminated on the film of self-sticking composition to obtain a self-sticking material. The self-sticking material obtained was printed and embossed on the art paper.

EXAMPLE 3

A self-sticking composition comprised the following ingredients:

Parts by weight
Graft polymer (65 parts of ethylene - vinyl acetate copolymer (26/39) grafted with 35 parts of vinyl chloride) _____ 100
Calcium stearate _____ 0.5
Dibasic lead phthalate _____ 2.5
Epocizer P206 (a stabilizer available from Nihon Reichhold K.K.) _____ 2.0
Di-2-ethylhexyl phthalate _____ 70

The composition was kneaded in a roll mill, pressed in a calender at about 100° C. into a film 100μ thick and laminated on a releasing paper having a silicone resin layer 5μ thick. An acrylic adhesive (modified by toluene diisocyanate) was coated by means of an air-knife coater on a fabric to form a base sheet 200μ thick. The base sheet was laminated in the film of self-sticking composition to obtain a self-sticking material. The obtained self-sticking material was printed on the fabric.

EXAMPLE 4

A self-sticking composition comprised the following ingredients:

| | Parts by weight |
|---|---|
| Graft polymer (55 parts of ethylene - vinyl acetate copolymer (33/22) grafted with 45 parts of vinyl chloride) | 100 |
| Zinc stearate | 0.5 |
| Barium stearate | 1.5 |
| Cadmium stearate | 1.5 |
| Dibutyl phthalate | 60 |

The composition was kneaded in a mill roll, pressed in a calender at about 100° C. into a film 70μ thick and laminated on a releasing paper having a polyvinyl alcohol layer 10μ thick. Then, onto the film of self-sticking composition, an acrylic adhesive modified by toluene diisocyanate was coated, and was laminated a polyvinyl chloride resin sheet 100μ thick having the following composition.

| | Parts by weight |
|---|---|
| Polyvinyl chloride (D.P.=1050) | 100 |
| Stearic acid | 0.1 |
| Dibutyl tin laurate | 2.0 |
| Di-2-ethylhexyl phthalate | 25 |

EXAMPLE 5

A self-sticking composition comprised the following ingredients:

| | Parts by weight |
|---|---|
| Graft polymer (40 parts of ethylene - vinyl acetate copolymer (20:20) grafted with 60 parts of vinyl chloride) | 100 |
| Stearic acid | 0.5 |
| "Mark" AC101 (Adeka Argus K.K.) | 2.0 |
| Di-2-ethylhexyl phthalate | 70 |

The composition was kneaded in a mill roll, pressed i na calender at about 100° C. into a film 100μ thick and laminated onto paper undercoated as in Exp. 1, an opposite side of which was previously provided with a silicone resin layer 5μ thick, to obtain a self-sticking material.

EXAMPLE 6

A coating solution was prepared from the following ingredients:

| | Parts by weight |
|---|---|
| Graft polymer (50 parts of ethylene - vinyl acetate copolymer (27.5/22.5) grafted with 50 parts of vinyl chloride) | 100 |
| "Epocizer" P.206 | 3 |
| Tetrahydrofuran | 400 |
| Methyl-2-ethyl ketone | 400 |
| Toluene | 100 |
| Triphenyl phosphate | 50 |

The coating solution was coated by a reverse roll coater on a releasing paper having a silicone resin layer 5μ thick and dried at 135° C. for 3 minutes to form a film 150μ thick of self-sticking composition, and polypropylene film 80μ thick surface-oxidized and undercoated with an aqueous emulsion of ethylene/vinyl acetate copolymer was laminated on the film of self-sticking composition to obtain a self-sticking material.

EXAMPLE 7

A coating solution was prepared from the following ingredients:

| | Parts by weight |
|---|---|
| Graft polymer (55 parts of ethylene - vinyl acetate copolymer (33/22) grafted with 45 parts of vinyl chloride) | 100 |
| Barium stearate | 1 |
| Cadmium stearate | 1 |
| Ethyl acetate | 300 |
| Methylethyl ketone | 500 |
| Di-2-ethylhexyl phthalate | 45 |

The coating solution was coated on a releasing paper having an unsaturated polyester resin layer 20μ thick and dried at 135° C. for 3 minutes to form a film 80μ thick of self-sticking composition. Polystyrene film 70μ thick undercoated as in Exp. 1 was laminated on the film of self-sticking composition to obtain a self-sticking material.

COMPARATIVE EXAMPLE 1

A solution was prepared from the following ingredients:

| | Parts by weight |
|---|---|
| Polyvinyl acetate | 20 |
| Polyoctyl acrylate | 70 |
| Polyethyl acrylate | 10 |
| Maleic anhydride | 7.5 |
| Toluene | 175 |
| Ethylacetate | 175 |

The solution was coated in an amount of 25 g./m.² as solid on a releasing paper having a silicone resin layer 5μ thick and heated at 110° C. for 2 minutes to evaporate the solvent and to perform a cross-linking reaction. A polyester resin sheet 50μ thick was laminated on the adhesive composition layer, to obtain a sticking material.

COMPARATIVE EXAMPLE 2

A solution was prepared from the following ingredients:

| | Parts by weight |
|---|---|
| Natural rubber | 60 |
| Styrene-butadiene rubber (styrene 25%) | 40 |
| Regenerated rubber | 5 |
| Polyterpene (M.P.=70° C.) | 48 |
| Polyterpene (M.P.=115° C.) | 2 |
| Glycerine ester of hydrogenated rosin | 13 |
| Triethyleneglycol ester of hydrogenated rosin | 1 |
| Toluene | 1000 |

The solution was coated in an amount of 30 g./m.² as solid on a releasing paper having a silicone resin layer 5μ thick and dried at 100° C. for 3 minutes. A regenerated cellulose film 40μ thick was laminated onto the adhesive composition layer to obtain a sticking material.

COMPARATIVE EXAMPLE 3

A composition comprised the following ingredients:

| | Parts by weight |
|---|---|
| Polyvinyl chloride (D.P.=1050) | 100 |
| Stearic acid | 0.2 |
| Barium stearate | 0.2 |
| Cadmium stearate | 0.3 |
| Dibutyl tin dilaurate | 2.0 |
| Di-2-ethylhexyl phthalate | 60 |

The composition was kneaded in a mill roll, pressed in a calender at 155° C. into a sheet 200μ thick and laminated on a releasing paper having an unsaturated polyester resin layer 20μ thick to obtain a sticking material.

COMPARATIVE EXAMPLE 4

A composition comprised the following ingredients:

| | Parts by weight |
|---|---|
| Graft polymer (50 parts of ethylene-vinyl acetate copolymer (27.5/22.5) grafted with 50 parts of vinyl chloride) | 100 |
| Stearic acid | 0.5 |
| Barium stearate | 0.3 |
| Cadmium stearate | 0.3 |
| Di-2-ethylhexyl phthalate | 10 |

The composition was kneaded in a mill roll, pressed in a calender at 150° C. into a film 100μ thick and laminated on a releasing paper having an unsaturated polyester resin layer 20μ thick to obtain a sticking material.

Various properties of the sticking materials obtained from the above Examples were evaluated.

Table 1 illustrates the results of the sticking smear to remain on a surface of an adherend and of the feasibility of reusing the self-sticking sheet after being stuck at a temperature of 60°±2° C. for 24 hours.

TABLE 1.—TEST RESULTS ON THE INFLUENCE OF A SELF-STICKING SHEET ON AN ADHEREND

| Adherend | Sticking sheet | Sticking smear to remain on the adherend | Peeling property after being stuck |
|---|---|---|---|
| Acrylonitrilestylene plate | Ex. 1 | None | Easily peelable, reusable. |
| Do | Ex. 2 | do | Do. |
| Do | Comparison Ex. 1 | Remained | Not peelable, not reusable. |
| Do | Comparison Ex. 2 | do | Do. |
| Do | Comparison Ex. 3 | None | Easily peelable, reusable. |
| Do | Comparison Ex. 4 | do | Do. |
| Vinylchloride plate (hard) | Ex. 1 | None | Do. |
| Do | Ex. 2 | do | Do. |
| Do | Comparison Ex. 1 | Remained | Not peelable, not reusable. |
| Do | Comparison Ex. 2 | do | Do. |
| Do | Comparison Ex. 3 | None | Easily peelable, reusable. |
| Do | Comparison Ex. 4 | do | Do. |
| Polycarbonate plate | Ex. 1 | None | Easily peelable, reusable. |
| Do | Ex. 2 | do | Do. |
| Do | Comparison Ex. 1 | Remained | Not peelable, not reusable. |
| Do | Comparison Ex. 2 | do | Do. |
| Do | Comparison Ex. 3 | None | Easily peelable, reusable. |
| Do | Comparison Ex. 4 | do | Do. |

Examples 3, 4, 5, 6, and 7 showed the same results as Examples 1 and 2.

Table 2 illustrates the results of blocking under a load at 20° C.

TABLE 2.—THE RESULTS OF BLOCKING

| | Blocking | Forcing out of self-sticking sheet or smear |
|---|---|---|
| Example No.: | | |
| 1 | None | None. |
| 2 | do | Do. |
| Comparison Ex.: | | |
| 1 | do | Being forced out. |
| 2 | do | Do. |
| 3 | Blocked, rough faced | None. |
| 4 | Remarkably blocked | Do. |

Examples 3, 4, 5, 6, and 7 showed the same results as the Examples 1 and 2.

Table 3 illustrates the results of peeling strength, sticking strength and stiffness.

TABLE 3.—THE RESULTS OF PEELING STRENGTH, STICKING STRENGTH, AND STIFFNESS

| | Peeling strength [1] (g./3 cm.) | Sticking strength (g./cm.$^2$) against— | | | Stiffness (mm.) |
|---|---|---|---|---|---|
| | | Stainless steel plate | Frosted glass | Paper | |
| Example No.: | | | | | |
| 1 | 45 | 5,000 | 520 | 600 | 81 |
| 2 | 28 | 5,200 | 500 | | 40 |
| 3 | 55 | 5,500 | 480 | | 85 |
| 4 | 50 | 5,500 | 470 | | 80 |
| 5 | | 5,000 | 470 | 500 | |
| 6 | 25 | 5,300 | 520 | | 75 |
| 7 | 22 | 5,000 | 420 | | 87 |
| Comparaison Ex.: | | | | | |
| 1 | 20 | >5,500 | >5,000 | [2] 650 | |
| 2 | 45 | >5,000 | >5,000 | [2] 650 | |
| 3 | 20 | 450 | 0 | 0 | |
| 4 | 25 | 2,500 | 0 | 170 | |

[1] Against a releasing layer of a releasing paper.
[2] Break.

We claim:

1. A self-sticking material which comprises a base sheet, a film of self-sticking composition, and a releasing paper having smooth surface, said self-sticking composition comprising 100 parts, by weight, of an ethylene-vinyl acetate/vinyl chloride graft polymer and 31 to 100 parts of a plasticizer.

2. A self-sticking material according to claim 1, wherein said graft polymer consists of 60 to 20%, by weight, of vinyl chloride units and 40 to 80% of ethylene-vinyl acetate copolymer units.

3. A self-sticking material according to claim 1, wherein said base sheet is selected from the group consisting of paper, synthetic paper, regenerated cellulose film, woven and nonwoven fabric, metal foil, a polyvinyl chloride, a polyethylene, a polypropylene, an acrylic resin, a polyamide, a polystyrene, a saturated polyester, copolymer of ethylene and vinyl acetate, copolymer of acrylonitrile and styrene, copolymer of acrylonitrile, butadiene, styrene, an unsaturated polyester, polyurethane and an epoxy resin.

4. A self-sticking material according to claim 1, wherein said releasing paper is coated with a releasing agent selected from the group consisting of polyethylene, polypropylene, polyvinyl alcohol, a polyamide, a silicone resin, a saturated and unsaturated polyester resin, urea-alkyd resin and a phenolic resin.

5. A self-sticking material according to claim 1, wherein said plasticizer is selected from the group consisting of dibutyl phthalate, di-n-octyl phthalate, di-2-ethylhexyl phthalate, diisooctyl phthalate, di-2-ethylhexyl adipate, di-2-ethylhexylsebacate, triphenyl phosphate, diphenyl-2-ethylhexyl phosphate, methylacetyl ricinolate, butyl phthalyl butylglycolate, polypropylene adipate and polypropylene sebacate.

6. A self-sticking material according to claim 1, wherein said base sheet is printed.

7. A self-sticking material according to claim 1, wherein said base sheet is embossed.

8. A self-sticking material according to claim 1, wherein said base sheet is printed and embossed.

9. A self-sticking material which comprises a base sheet, a film of self-sticking composition, and a releasing paper having smooth surface, said self-sticking composition comprising 100 parts, by weight, of an ethylene-vinyl acetate/vinyl chloride graft polymer, 31 to 100 parts of a plasticizer, and 0.5 to 5 parts of a stabilizer.

10. A self-sticking material which comprises a base sheet, a film of self-sticking composition, and a release paper having a smooth surface, said sticking composition comprising 100 parts, by weight, of an ethylene-vinyl acetate/vinyl chloride graft polymer, 31 to 100 parts of a plasticizer, 0.5 to 5 parts of a stabilizer, and 0.1 to 0.5 parts of lubricant.

11. A self-sticking material which comprises a base sheet, an adhesive, and a film of self-sticking composition, said self-sticking composition comprising 100 parts, by weight, of an ethylene-vinyl acetate/vinyl chloride graft polymer and 31 to 100 parts of a plasticizer.

12. A self-sticking material according to claim 11, wherein said base sheet is selected from the group consisting of paper having a releasing layer, metal foil, polyethylene, polypropylene, and a saturated polyester.

13. A self-sticking material according to claim 11, wherein said graft polymer consists of 60 to 20%, by weight, of vinyl chloride units and 40 to 80% of ethylene-vinyl acetate copolymer units.

14. A self-sticking material according to claim 11, wherein said plasticizer is selected from the group consisting of dibutyl phthalate, di-n-octyl phthalate, di-2-ethylhexyl phthalate, diisooctyl phthalate, di-2-ethylhexyl adipate, di-2-ethylhexyl-sebacate, triphenyl phosphate, diphenyl-2-ethylhexyl phosphate, methylacetyl ricinolate, butylphthalyl butylglycolate, polypropylene adipate and polypropylene sebacate.

15. A self-sticking material which comprises a base sheet, an adhesive, and a film of self-sticking composition, said self-sticking composition comprising 100 parts, by weight, of an ethylene-vinyl acetate/vinyl chloride graft polymer, 31 to 100 parts of a plasticizer, and 0.5 to 5 parts of a stabilizer.

16. A self-sticking material which comprises a base sheet, an adhesive, and a film of self-sticking composition, said self-sticking composition comprises 100 parts, by weight, of an ethylene-vinyl acetate/vinyl chloride graft polymer, 31 to 100 parts of a plasticizer, 0.5 to 5 parts of a stabilizer, and 0.1 to 0.5 parts of a lubricant.

17. A process for producing a self-sticking material which comprises coating successively an adhesive and a solution comprising 100 parts, by weight, of an ethylene-vinyl acetate/vinyl chloride graft polymer, 31 to 100 parts of a plasticizer and 300 to 1000 parts of solvent on a base sheet and drying said coated sheet.

18. A process for producing a self-sticking material according to claim 17, wherein said solvent is selected from the group consisting of cyclohexanone, tetrahydrofuran, monochloro benzene, dichloro benzene, nitrobenzene, benzene, toluene, xylene, dioxane, dimethyl formamide, ethylene dichloride, trichloro ethylene, tetrachloroethylene, acetone, methylethyl ketone, methyl acetate, ethyl acetate, butyl acetate and cellosolve acetate.

19. A process for producing a self-sticking material chloroethylene, acetone, methylethyl ketone, methyl acetate, ethyl acetate, butyl acetate and Cellosolve acetate. sists of 60 to 20%, by weight, of vinyl chloride units and 40 to 80% of ethylene-vinyl acetate copolymer units.

20. A process for producing a self-sticking material which comprises coating successively an adhesive and a solution comprising 100 parts, by weight, of an ethylene-vinyl acetate/vinyl chloride graft polymer, 31 to 100 parts of a plasticizer, 0.5 to 5 parts of a stabilizer and 300 to 1000 parts of solvent on a base sheet and drying said coated sheet.

21. A process for producing a self-sticking material which comprises, coating a solution comprising 100 parts, by weight, of an ethylene-vinyl acetate/vinyl chloride graft polymer, 31 to 100 parts of a plasticizer and 300 to 1000 parts of solvent on a releasing paper, drying said solution to obtain a film of self-sticking composition and laminating a base sheet onto said film of self-sticking composition.

22. A process for producing a self-sticking material according to claim 21, wherein said solvent is selected from the group consisting of cyclohexanone, tetrahydrofuran, monochloro benzene, dichloro benzene, nitrobenzene, benzene, toluene, xylene, dioxane, dimethyl formamide, ethylene dichloride, trichloro ethylene, tetrachloroethylene, acetone, methylethyl ketone, methyl acetate, ethyl acetate, butyl acetate, and cellosolve acetate.

23. A process for producing a self-sticking material according to claim 21, wherein said graft polymer consists of 60 to 20%, by weight, of vinyl chloride units and 40 to 80% of ethylene-vinyl acetate copolymer units.

24. A process for producing a self-sticking material which comprises coating a solution comprising 100 parts, by weight, of an ethylene-vinyl acetate/vinyl chloride graft polymer, 31 to 100 parts of a plasticizer, 0.5 to 5 parts of a stabilizer, and 300 to 1000 parts of solvent on a releasing paper, drying said solution to obtain a film of sticking composition and laminating a base sheet onto said film of self-sticking composition.

25. A process for producing a self-sticking material which comprises laminating a film of a self-sticking composition comprising 100 parts, by weight, of an ethylene-vinyl acetate/vinyl chloride graft polymer, 31 to 100 parts of a plasticizer, 0.5 to 5 parts of a stabilizer with or without 0.1 to 0.5 part of a lubricant on a releasing paper to form a film of self-sticking composition and laminating a base sheet onto said film of self-sticking composition.

26. A process for producing a self-sticking material according to claim 25, wherein said graft polymer consists of 60 to 20%, by weight, of vinyl chloride units and 40 to 80% of ethylene-vinyl acetate copolymer units.

27. A process for producing a self-sticking material which comprises coating an adhesive on a base sheet and laminating thereon a film of a self-sticking composition comprising 100 parts, by weight, of an ethylene-vinyl acetate/vinyl chloride graft polymer, 31 to 100 parts of a plasticizer, 0.5 to 5 parts of a stabilizer with or without 0.1 to 0.5 part of a lubricant.

28. A process for producing a self-sticking material according to claim 27, wherein said graft polymer consists of 60 to 20%, by weight, of vinyl chloride units and 40 to 80% of ethylene-vinyl acetate copolymer units.

References Cited

UNITED STATES PATENTS

| | | | |
|---|---|---|---|
| 3,556,894 | 1/1971 | Bernard | 156—334 |
| 3,355,516 | 11/1967 | Hardt | 260—884 |
| 3,607,980 | 9/1971 | Thomas | 260—884 |

MARION E. McCAMISH, Primary Examiner

U.S. Cl. X.R.

117—161 UZ, 161 UH, 161 UF; 156—334; 161—250, 406; 260—878

UNITED STATES PATENT OFFICE
CERTIFICATE OF CORRECTION

Patent No. 3,812,005　　　　　　　　Dated May 21, 1974

Inventor(s) KEIZO KATAGIRI et al

It is certified that error appears in the above-identified patent and that said Letters Patent are hereby corrected as shown below:

Column 1, line 48: rewrite "adherened" as ---adherend--- .

Column 11, Claim 19: rewrite as follows:

---A process for producing a self-sticking material according to Claim 17, wherein said graft polymer consists of 60 to 20%, by weight, of vinyl chloride units and 40 to 80% of ethylene-vinyl acetate copolymer units.--- .

Signed and sealed this 21st day of January 1975.

(SEAL)
Attest:

McCOY M. GIBSON JR.　　　　　　　C. MARSHALL DANN
Attesting Officer　　　　　　　　Commissioner of Patents